Nov. 13, 1962 J. W. BODNAR ETAL 3,063,625

DATA PROCESSING SYSTEMS

Filed Sept. 29, 1958 4 Sheets-Sheet 1

INVENTORS
JOHN W. BODNAR
NORMAN J. ROSEN
CARL P. SPAULDING

BY Christie, Parker & Hale
ATTORNEYS

DATA PROCESSING SYSTEMS

Filed Sept. 29, 1958 4 Sheets-Sheet 2

INVENTORS
JOHN W. BODNAR
NORMAN J. ROSEN
CARL P. SPAULDING

BY Christie, Parker & Hale
ATTORNEYS

INVENTORS
JOHN W. BODNAR
NORMAN J. ROSEN
CARL P. SPAULDING
BY
Christie, Parker & Hale
ATTORNEYS INVENTORS
JOHN W. BODNAR
NORMAN J. ROSEN
CARL P. SPAULDING
BY
Christie, Parker & Hale
ATTORNEYS United States Patent Office 3,063,625

Patented Nov. 13, 1962

3,063,625

DATA PROCESSING SYSTEMS

John W. Bodnar, Arcadia, Norman J. Rosen, Altadena, and Carl P. Spaulding, San Marino, Calif., assignors to Datex Corporation, Monrovia, Calif., a corporation of California Filed Sept. 29, 1958, Ser. No. 763,911

8 Claims. (Cl. 235—61)

The present invention relates to data processing systems and more particularly to a data processing system for entering data into a calculating machine.

In the past data has generally been entered into a manual keyboard of a mechanical or electromechanical calculating machine by means of a human operator. Such an operation is inherently expensive, slow, and only as reliable as the human operator. In certain applications some of the above disadvantages have been overcome by placing solenoids above the usual mechanical keyboards of calculating machines and supplying electrical signals to selected solenoids which in turn actuate the mechanical keys of the keyboard to enter the desired data into the machine. While this type of system possesses certain advantages over the human operator system, it requires extremely large solenoids to supply the necessary power for actuating the conventional mechanical keys of the keyboard which must move massive lever mechanisms. The time response of such solenoids and associated lever mechanisms is also relatively slow which hinders the use of such prior art systems with modern high speed data sources. Furthermore, the heat generated by the solenoids limits the operation of the solenoids to a very short time duration unless some means is provided for dissipating the heat. In summary the prior art systems for remotely controlling calculating machines are expensive, inefficient, bulky and slow.

The foregoing disadvantages are overcome by the present invention in which a calculating machine is electrically actuated and remotely controlled to enter and perform selected operations on selected data in a minimum of time and with a minimum of expense.

In accordance with the present invention a data processing system is provided which includes a calculating machine having means for entering and performing a predetermined operation on a selected group of characters such as a decimal number during an operating cycle of the machine. The machine includes a plurality of slidably disposed character control slide bars for determining the individual characters of the group of characters such as the digits of a number to be entered into the machine in accordance with the position of the individual character control slide bars. The machine also includes at least one slidably disposed function control slide bar for controlling the mode of operation of the machine during an operating cycle thereof in accordance with the position of the function slide bar. A plurality of character control solenoids are associated with each of the character control slide bars and at least one function control solenoid is associated with the function control slide bar. Each of the solenoids is secured to the machine and includes an armature. Each of the armatures of the character control solenoids is arranged to engage the respective character control slide bar during an operating cycle when the solenoid is energized to cause the particular character control slide bar to assume a selected position indicative of a particular character such as a digit to be entered into the machine. Means under the control of the armature of the function control solenoid is included in the machine to engage the function slide bar during an operating cycle when the function control solenoid is energized to thereby position the function control slide bar at a selected position indicative of a particular mode of operation of the machine. The data processing system further includes a source of data signals and means for selectively coupling the source of data signals to the character control solenoids to enter a selected group of characters into the machine. A source of function control signals and means for selectively coupling the source of function control signals to the function control solenoid or solenoids are provided to select a particular mode of operation for the calculating machine, whereby a selected group of characters such as a decimal number may be entered and operated on by the machine in a particular manner such as adding or subtracting the entered number to a previously entered number and printing the entered number or total.

This invention is explained in more detail with reference to the drawings, in which.

Figure 1:
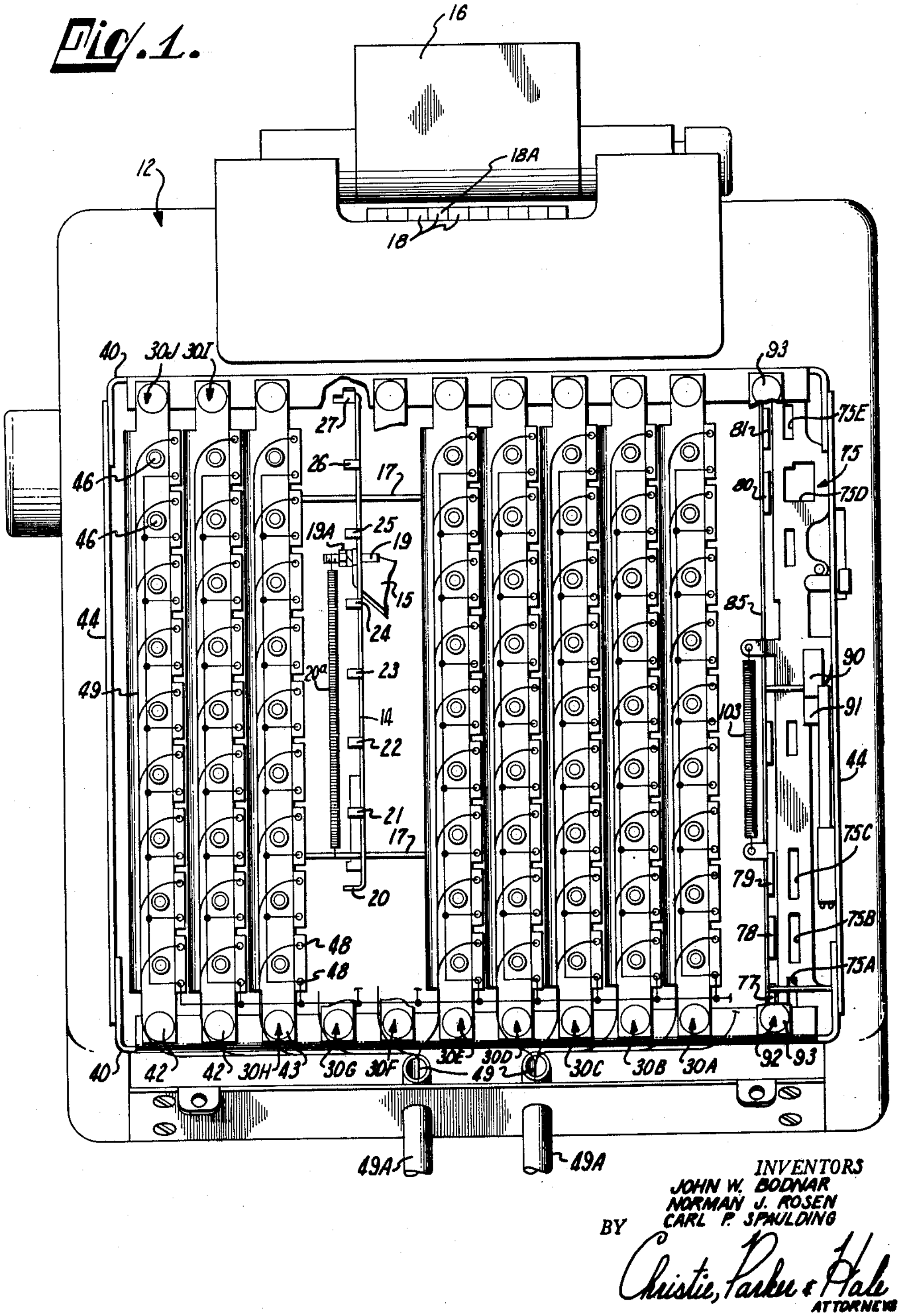
FIG. 1 is a plan view, partly broken away, of a calculating machine including a plurality of solenoids secured thereto for controlling the data entered into the machine and the operation of the machine.

Referring now to the drawings and more particularly to FIG. 1, a calculating machine indicated generally at 12 is provided which includes means for entering and performing a predetermined operation such as adding, subtracting, printing, etc., on a given group of characters, for example, a decimal number during an operating cycle of the machine. The term character as used herein includes numbers, letters and other symbolic characters capable of conveying information. The calculating machine 12, for example, may be a conventional adding and listing machine for adding or subtracting and printing a ten digit decimal number on a roll of paper 16. Such machines are well known in the art and normally employ a standard ten column mechanical keyboard for positioning the decade slide bars to enter a selected number. The standard mechanical keyboard is replaced in the system of the present invention by a plurality of character control solenoids as will be more fully described. One such machine is manufactured by the Monroe Calculating Machine Company under the model number 410—11—011 and the construction and operation of the machine is described in the Monroe Machine Service Bulletin No. 450.

The calculating machine 12 includes ten character control or decade slide bars 14 (only one of which is shown)

which are slidably mounted on guides 17 for controlling the individual characters or digits to be entered into the machine in accordance with the position of the individual decade slide bars. The machine 12 also includes ten type bars 18, each of which is adapted to selectively print on the paper 16 any one of the digits zero through nine. The machine 12 further includes an accumulator (not shown) having ten data entry columns for accumulating a group of numbers into the machine for adding and subtracting purposes. Each of the decade slide bars 14 controls the particular digit in any one column that is entered into the machine by means of an arm 15 which is secured to the slide bar 14 by bolt 19 and nut 19A and mechanically coupled to the accumulator and to the type bars 18. For example, the decade slide bar 14, shown in FIG. 1, controls the seventh data entry column of the accumulator and the seventh type bar 18A in accordance with the position of the slide bar 14 so that a particular number is registered in the accumulator and the seventh type bar 18A will be raised or lowered to bring the particular number thereon adjacent the paper 16 when the slide bar 14 is at a predetermined position. The decade slide bar 14 is biased toward the front of the machine by means of a helical bias spring 20 which is secured at one end to one of the guides 17 and at the other end to the bolt 19. As is more clearly described in the service bulletin referred to above, the spring $20^a$ causes each of the decade slide bars 14 to move toward the front of the machine during an operating cycle until the slide bars 14 are stopped at selected positions to enter a particular number into the respective columns of the machine. Each of the decade slide bars 14 includes eight spaced indexing means or tabs 20–27.

To control the digits that are entered into the machine by the decade slide bars 14 ten character control solenoid module assemblies 30A–30J are secured to the machine 12. One of the module assemblies is associated with each of the decade slide bars 14 for controlling the position of the respective decade slide bars during an operating cycle to enter a particular number into the machine, as will be more fully described later. Each of the character control solenoid module assemblies includes nine spaced solenoids 45A–45I suitably secured to a channel-shaped frame member 34. As may best be seen in FIGS. 2 and 3, the frame members 34 include an L-shaped bracket 35 and a U-shaped bracket 36 fastened to the bottom end of the bracket 35 by means of screws 37. The frame members 34 are secured to end brackets 40 by means of screws 42 which are inserted through holes 43 in the ends of the frame members 34 and threadedly engage the brackets 40. The end brackets 40 are suitably secured to side brackets 44 which are in turn suitably fastened to the top portion of the machine 12 so that the solenoid module assemblies 30 are positioned above the respective decade slide bars 14.

Figures 2, 4, 6:
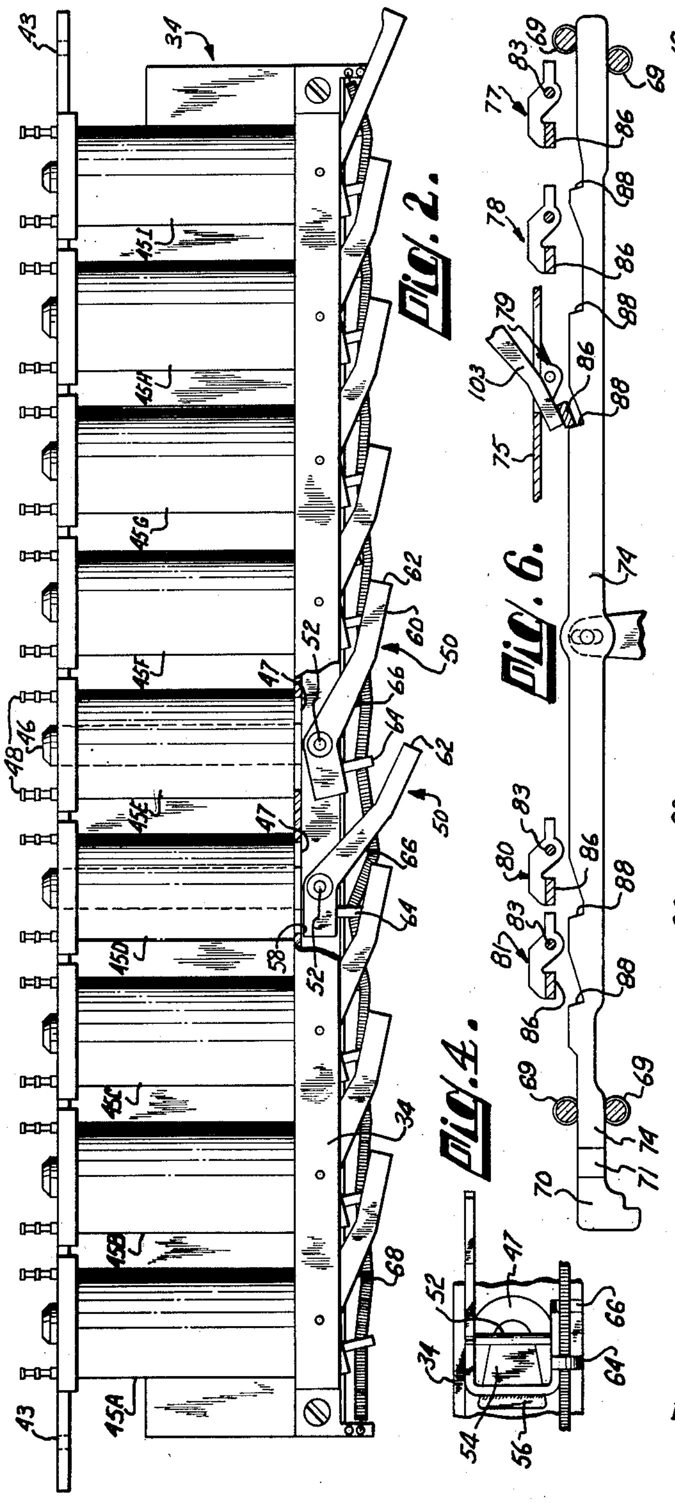
FIG. 2 is a side view of a character control solenoid module assembly for use with the machine of FIG. 1.
FIG. 4 is a bottom plan view of one of the solenoids of the assembly of FIG. 3.
FIG. 6 is a sectional view of the function control slide bar arrangement taken along line 5—5 and illustrating the operation of one of the function control solenoids of FIG. 7.

Each of the character control solenoids includes a magnetic core 46, an energizing winding (not shown), a nonmagnetic isolating annular plate 47, a pair of terminals 48 conductively connected to the energizing winding and a pivotally or rotatably mounted armature indicated generally at 50. The terminals 48 are connected to a source of data control signals (to be described) by means of insulated conductors 49 and cables 49A, as shown in FIG. 1. The armature 50 is rotatably mounted on the frame member 34 by means of a nonmagnetic pin 52 which is journaled in the frame member 34 as may best be seen in FIG. 4. A magnetic plate 54 is secured to the pin 52 and extends toward the front of the frame member 34 so that an end portion 56 of the plate 54 is positioned below a portion 58 of the magnetic frame 34. Thus when the data control solenoid 45 is energized the magnetic plate 54 is urged in a clockwise direction toward the portion 58 as shown in FIG. 2. An arm 60 of nonmagnetic material such as stainless steel is secured to the pin 52 and the plate 54 and extends outwardly and downwardly so that the arm 60 will rotate with the plate 54 when the respective solenoid is energized and thus move an end 62 of the arm 60 downwardly with respect to the frame member 34. When the end 62 is moved to its downwardmost position, as is shown in connection with the solenoid 45D of FIG. 2, it will engage one of the indexing tabs 20–27 of the respective decade slide bar 14 as the slide bar 14 is moved toward the front of the machine during an operating cycle and thus index the travel of the slide bar.

The armature 50 also includes a pair of spaced spring engaging members 64 and 66 of nonmagnetic material which may be formed integrally with the arm 60. The member 64 is L-shaped and the member 66 is U-shaped. A helical bias spring 68 is secured to each end of the frame member 34 as shown in FIG. 2, and is disposed under the spring engaging member 64 and over the spring engaging member 66 of each of the armatures of the character control solenoids 45A–45I. The helical bias spring 68 tends to remain straight and thus biases the armatures 50 and the extending arms 60 of the solenoids in a counterclockwise direction.

To enter a particular digit in any column of the machine 12, one or none of the solenoids associated with the respective decade slide bar is energized to index the travel of the decade slide bar to enter the selected number in the respective column. The machine 12 includes a stop (not shown) for engaging each of the arms 15 attached to the decade slide bars, when the slide bars are not indexed by a character control solenoid, to enter the number nine in the respective column. When the solenoid 45A of any decade solenoid module assembly is energized the interposing arm 60 thereof engages the indexing tab 20 of the respective decade slide bars during an operating cycle to register the numeral one in the respective column. When the solenoids 45B–45H in any decade solenoid module assembly are energized the interposing arms 60 of the solenoids engage the indexing tabs of the respective slide bars 21–27 to enter the numbers 2–8 into the machine in the respective column. When the solenoid 45I of any solenoid assembly is energized the interposing arm 60 thereof engages the indexing tab 27 and enters a zero into that column.

Figure 5:
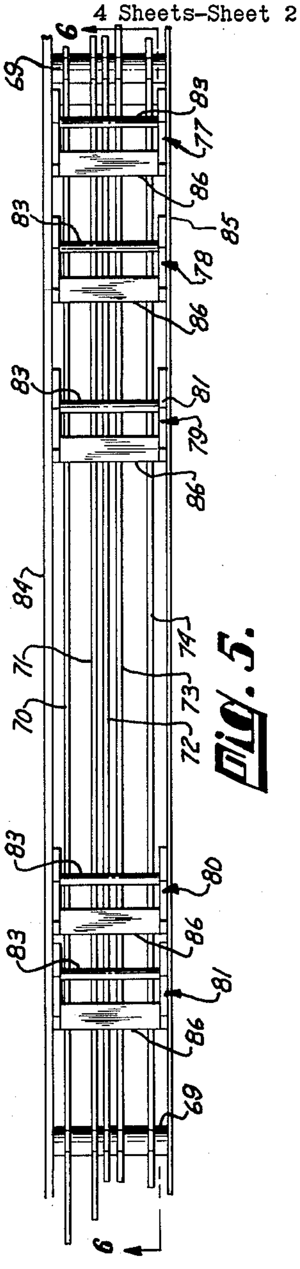
FIG. 5 is a top view of the function control slide bar arrangement of the calculating machine of FIG. 1.

The calculating machine 12 also includes a plurality of function control slide bars 70–74 slidably mounted on guide rods 69 to control the particular mode of operation of the machine in accordance with their position, as is described in detail in the above service bulletin. These function control slide bars are disposed below an interlock operating slide 75 and five rotatably mounted stop members 77–81, as may best be seen in FIGS. 1 and 5. The interlock operating slide 75 includes five interlock slots 75A–75E through which the stop members are selectively actuated as will be described. Each of the rotatably mounted stop members includes a pin 83 which is journaled in brackets 84 and 85. Each of the stop members 77–81 also includes a stop bar 86 which is adapted to engage indexing means or indentations 88 in each of the function control slide bars when rotated in the counterclockwise direction to index the travel of the function control slide bars, as may best be seen in FIG. 6. Each of the stop members is biased by means of a spring (not shown) in the clockwise direction to normally hold the stop bars 86 out of engagement with the indexing indentations 88 in the function control slide bars. A latch bar 90 is secured to the interlock operating slide 75 and arranged to cooperate with the armature of a starting solenoid to initiate the operating cycle of the machine, as will be described in more detail.

A function control solenoid module assembly 92 is secured to the end brackets 40 by means of bolts 93 and disposed above the interlock operating slide 75 and the function control operating slides 70–74 to control the positioning of the slides 70–74 during an operating cycle and thereby the mode of operation of the calculating machine 12.

Figures 3, 7, 8, 9:
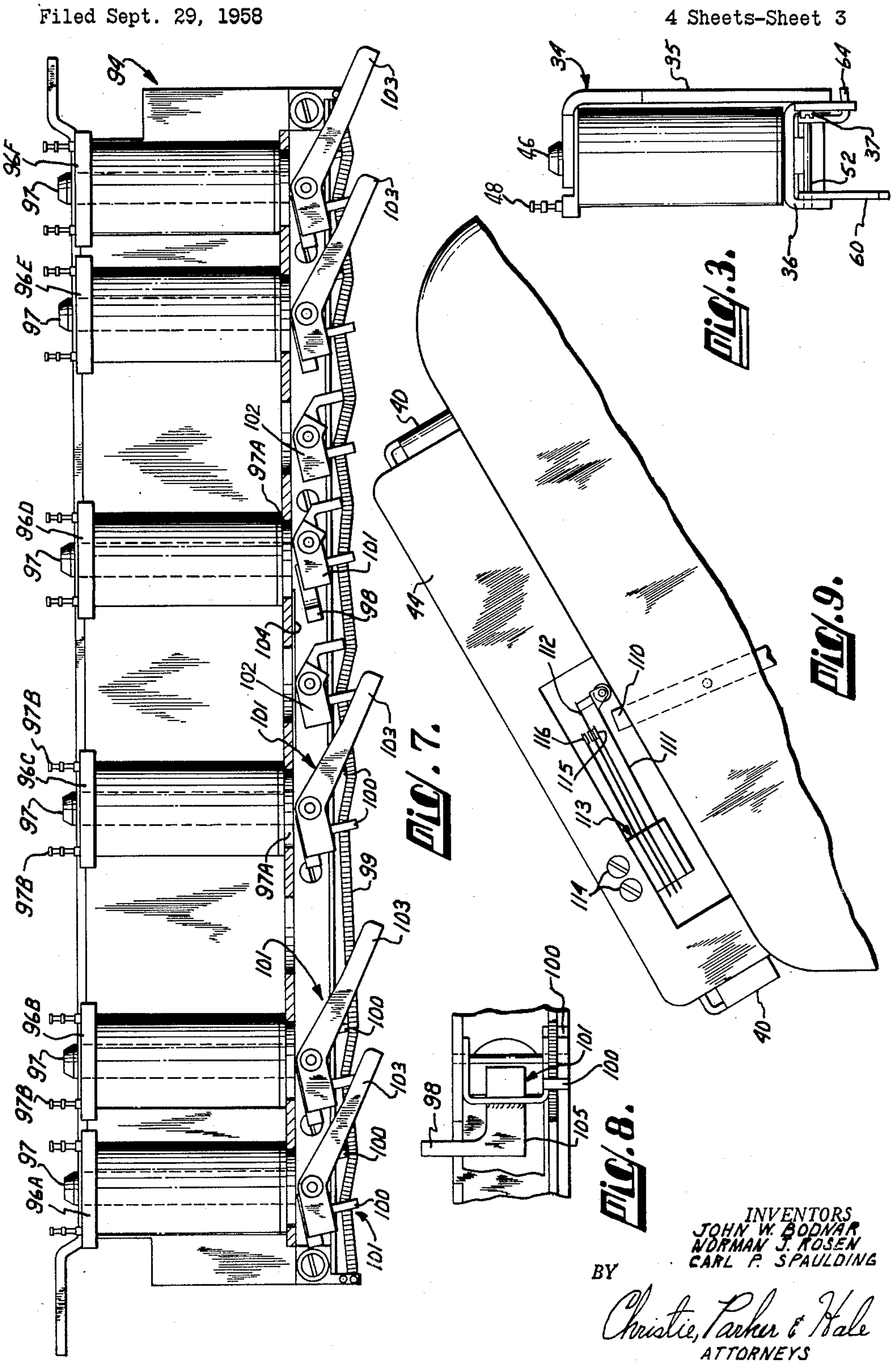
FIG. 3 is a side view of the solenoid module assembly of FIG. 2.
FIG. 7 is a side view, partly broken away, of a function control solenoid module assembly for use with the machine of FIG. 1.
FIG. 8 is a bottom view of one of the solenoids of FIG. 7.
FIG. 9 is a side view of the top portion of the calculating machine of FIG. 1 illustrating the supporting brackets for the solenoid assemblies and the end-of-cycle switch carried thereby.

Referring now to FIG. 7, the function control solenoid module assembly is shown as including a magnetic frame member 94 with five function control solenoids, 96A, 96B, 96C, 96E, 96F, and a starting solenoid 96D secured thereto. These solenoids are similar to the data control solenoids and include substantially the same rotatably mounted armature arrangement, with the exception of the starting solenoid 96D which includes a rotatably mounted armature 101 having a latch releasing arm 98 extending at right angles to the plane of the frame member 94, as may be seen in FIG. 8. The latch releasing arm 98 is arranged to cooperate with the latch bar 90 to initiate the operating cycle for the machine 12, as will be fully described. Each of the solenoids 96A–96F includes a magnetic core 97, an energizing winding (not shown), a nonmagnetic isolating washer 97A, an armature 101 and a pair of terminals 97B suitably connected to the energizing winding. The terminals 97B are also connected to a source of function control signals (to be described) by means of insulated conductors 49.

The armatures 101 of the solenoids 96A, 96B, 96C, 96E, 96F have extending arms 103 which are arranged to extend through the interlock slots 75A–75F, respectively, and engage the rotatable stop members 77–81, respectively, when the solenoids are energized to thereby cause the respective stop members to rotate in the counterclockwise direction and engage the respective indexing indentations 88 in the slide bars 70–74. As shown in FIG. 6, the extending arm 103 of the solenoid 96C is shown in its operative position, that is, engaging the stop member 79 which in turn engages the respective indexing indentations 88 in the function control slide bars 70–74 to cause the slide bars to assume a selected position indicative of a particular mode of operation, e.g., the adding mode of operation. The solenoids 96A, 96B, 96E and 96F control the total, subtotal, subtract and nonadd modes of operation respectively for the calculating machine 12.

A helical bias spring 99 is coupled to spring engaging members 100 of armatures 101 of the solenoids 96A–96F to urge the armatures in their inoperative position. The spring engaging members 100 may be identical to the spring engaging members of the armatures of the character control solenoids. A dummy armature 102 which also includes two spring engaging members 100 is secured to the frame member 94 on each side of the armature of the starting solenoid 96D to increase the restoring torque of the spring 99 on the armature of the solenoid 96D.

When the solenoid 96D is not energized the arm 98 thereof engages a shoulder 91 of the latch bar 90 to maintain the operating slide 75 in its uppermost position. Considerable force is required to disengage the arm 98 from the shoulder 91 to initiate an operating cycle of the calculating machine. To supply this necessary force the starting solenoid 96D includes more turns in its energizing winding. Also the starting solenoid 96D is designed to be more efficient than the character and function solenoids in that the magnetic plate 105 of the armature of the starting solenoid extends completely under the magnetic core 97 thereof. Due to the large number of turns in the energizing winding of the solenoid 96D the magnetic core 97 and the magnetic armature plate 105 thereof tend to become saturated when the solenoid 96D is energized and remain polarized after the solenoid is de-energized. To prevent the armature of this solenoid from sticking to the frame member 94 after the solenoid has been de-energized a copper shim 104 is disposed between the magnetic portion 105 and the frame member 94, as may be seen in FIG. 7.

To cause the operating slide 75 to move toward the front of the machine when arm 98 is disengaged from the latch bar 90 to initiate an operating cycle a bias spring 103 is secured between the stationary bracket 85 and the operating slide 75. To operate the machine one or none of the character control solenoids associated with each of the decade slide bars is energized depending upon the number to be entered into the machine and one of the function control solenoids for controlling the total, subtotal, add, subtract and nonadd modes of operation of the machine is energized. After the selected character and function control solenoids have been energized or while these solenoids are being energized the starting solenoid 96D is energized which removes the latch bar arm 98 from contact with the latch bar 100, thereby permitting the slide 75 to move toward the front of the machine. The interlock operating slot 75 moves toward the front of the machine until it engages the extending arm 103 of the particular function control solenoid that has been energized such as the arm 103 of the solenoid 96C as shown in FIG. 7. This operating slide 75 moves above the lowermost portion of the arm 103 of the energized solenoid 96C to prevent the arm 103 from raising or from disengaging the respective rotatable stop member during the operating cycle. The interlock operating slide 75 at this time is positioned below the arms 103 of the remaining function control solenoids to prevent the arms 103 thereof from engaging the rotatable stop members during the remainder of the operating cycle of the machine.

When the calculating machine has completed a cycle of operation and performed a particular operation on a selected number a trip bar 110 which is rotatably mounted on the machine is rotated in the clockwise direction by the main shaft drive arm (not shown) of the machine 12 to actuate an end-of-cycle switch 113 that is mounted on the side bracket 44 by means of screws 114. The switch 113 includes a movable contact 112, stationary contacts 115 and 116 and a spring biased actuating arm 111. The contacts 112 and 115 are normally closed and the trip bar 110 raises the arm 111 and the contact 112 to close the contacts 112 and 116 at the end of the machine cycle.

Figure 10:
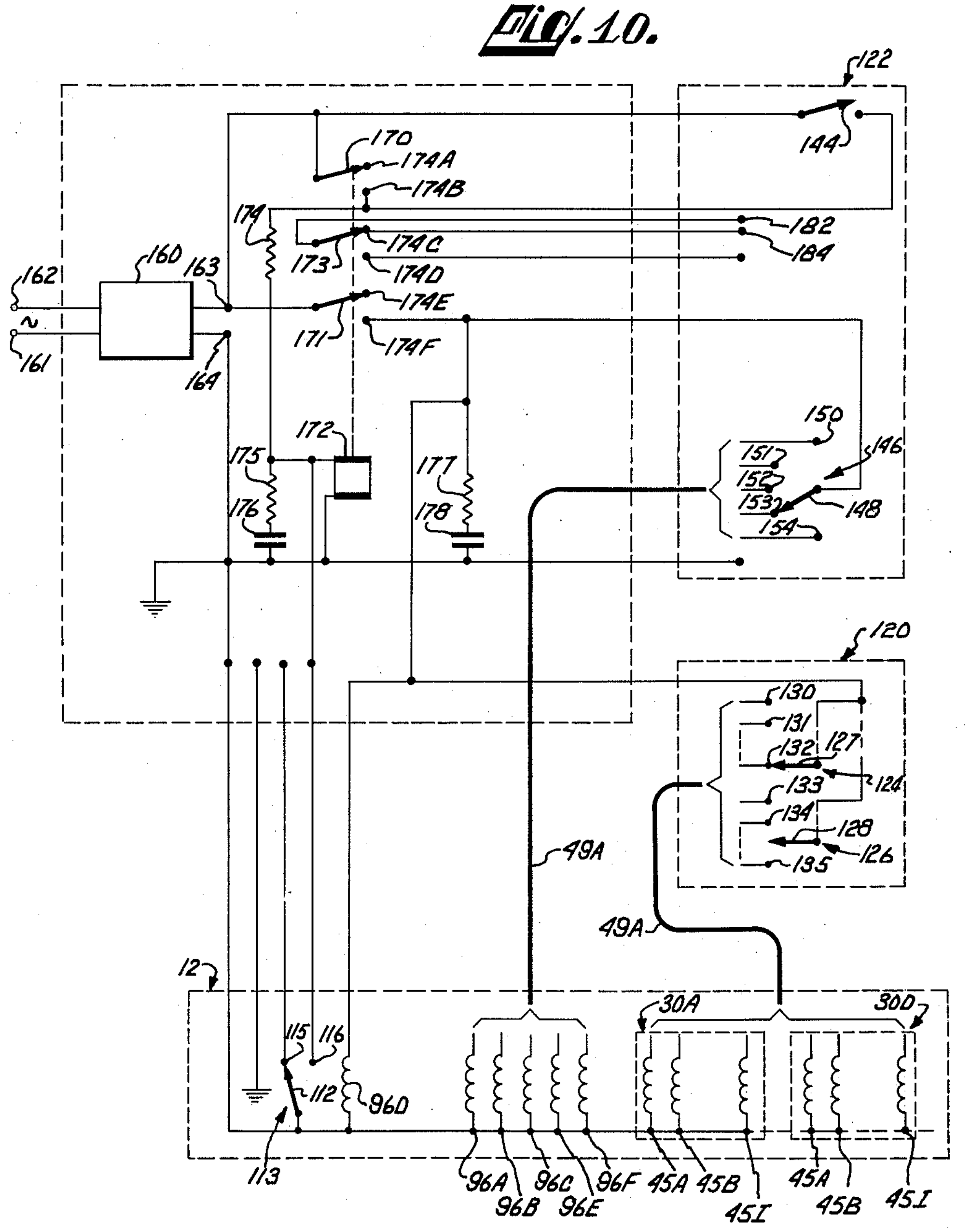
FIG. 10 is a schematic circuit diagram of the data processing system in which the solenoids carried by the calculating machine of FIG. 1 are represented by their energizing windings.

Referring now to FIG. 10, there is shown a schematic circuit diagram of a data processing system in accordance with the present invention in which the starting solenoid 96D, the function control solenoids 96A, 96B 96C, 96E, 96F and the character control solenoids 45A, 45B and 45I in the first and fourth decade solenoid module assemblies 30A and 30D, respectively, are represented by their energizing windings. A source of character control signals is indicated generally at 120 and a source of function control signals is indicated generally at 122. The character control source 120 includes a rotating switch for each of the ten decade solenoid module assemblies. However, only two switches 124 and 126 for controlling the first and fourth decade module assemblies 30A and 30D are shown to simplify the description. The rotating switches 124 and 126 include movable contact members 127 and 128 respectively. Movable contact member 127 is adapted to selectively engage nine stationary contacts, only three of which are shown, e.g., 130, 131, 132, and the movable contact 128 is arranged to selectively engage one of nine stationary contacts, only three of which are shown, e.g., 133, 134 and 135. The contacts 130, 131 and 132 are connected by means of the cable 49A to the energizing windings in the solenoids 45A, 45B and 45I respectively, for the first decade solenoid module assembly 30A. The stationary contacts 133, 134 and 135 are also coupled by means of the cable 49A to the energizing windings of the solenoids 45A, 45B and 45I respectively, of the fourth decade solenoid module assembly 30D. The function control source 122 includes a normally open starting switch 144 and a function control rotating switch 146. The function control switch includes a movable contact 148 and stationary contacts 150—154 which are connected to the energizing windings of the function control solenoids 96A, 96B, 96C, 96E, 96F respectively by means of one of the cables 49A.

A power supply unit 160 is provided to supply direct current voltage to the movable contacts 127, 128 and 148 and the switch 144. The power supply unit 160 includes a pair of input terminals 161 and 162 which are adapted to be connected to a suitable source of energizing potential such as 110 volt 60 cycle alternating current source (not shown). The power supply 160 also includes a pair of output terminals 163 and 164 across which a voltage of approximately 30 volts (direct current) is established. The output terminal 164 is grounded and the output terminal 163 is connected to the movable contact of the switch 144 and to movable contacts 170 and 171 of a holding relay 172. A voltage dropping resistor 174 is connected in series between the stationary contact of the switch 144 and the energizing winding of the relay 172, one terminal of which is grounded as shown. The relay 172 includes a third movable contact 173 and six stationary contacts 174A–174F. The movable contact 112 of the end-of-cycle switch 113 is also connected to ground and the normally open stationary contact 116 is connected in parallel with the energizing winding of the relay 172 as shown so that when the end-of-cycle switch 113 is closed due to the calculating machine 12 completing an operating cycle, the energizing winding of the relay 172 will be shorted out. A damping resistor 175 and capacitor 176 are connected across the energizing winding of the relay 172. Anothed damping resistor 177 and capacitor 178 are connected between the movable contact 148 of the switch 146 and ground.

In operation the starting switch 144 is closed momentarily, for example, 20 microseconds, which energizes the relay 172 through the voltage dropping resistor 174, thereby causing the relay 172 to close its normally open contacts or cause the movable contacts 170, 173 and 171 to engage the stationary contacts 173B, 173D and 173F respectively. The relay 172 is self-holding in that current is now conducted to the energizing winding thereof through the closed contacts 170 and 173B. At this time the movable contacts 127, 128 and 148 are connected to the terminal 163 of the power supply unit 160. As shown, the movable contact 148 of the switch 146 is connected to the stationary contact 153 and supplies an energizing current to the function control solenoid 96E. At this same time the movable contact 127 of the switch 124 engages the stationary contact 132 and supplies an energizing current to the solenoid 45I in the first decade module assembly 30A. The movable contact 128 of the switch 126 is not connected to any stationary contact at this time and no solenoid of the fourth decade module assembly 30D is energized. Energizing current is also supplied to the starting solenoid 96D at this time which removes the latch release arm 98 from the latch bar 90 to initiate the operating cycle of the calculating machine 12. The energized function control solenoid 96E engages the rotatable stop member 80 with its armature which in turn indexes the function control slide bars 70–74 to index the bars and cause the machine to perform its non-add mode of operation. The extending arm 60 of the solenoid 45I engages the indexing member 27 of the first decade slide bar as the decade slide bar move toward the front of the machine during the operating cycle to register a zero in the first column and cause the first type bar to print a zero on the paper 16. The fourth decade slide bar is not indexed by the fourth solenoid module assembly 30D and thus a nine is registered in the fourth column and printed on the paper 16 by the fourth type bar.

At the end of the cycle the switch 113 is actuated by the trip bar 110 and closes the contacts 112 and 116. This shorts out the energizing winding of the relay 172 which causes the contacts 170, 173 and 171 to engage the contacts 174A, 174C and 174E respectively and disconnect the switches 146, 127 and 128 from the power supply unit 160. At this time the contacts 173 and 174C close the circuit between a pair of terminals 182 and 184 in the function control source 122 to establish an end-of-cycle signal so that another number and mode of operation may be selected by the data and function control sources.

It is of course not necessary that rotating contacts be provided for energizing the starting, character and function control solenoids for operating the calculating machine 12. It is only necessary that some means be provided to selectively energize the desired solenoids.

While the calculating machine 12 is illustrated as performing selected operations on decimal numbers, it is to be understood that other types of calculating and printing machines could be employed in the data processing system of the present invention to perform selected operations on any group of character symbols.

The solenoid module assemblies employed in the present data processing system are extremely compact and require very little additional space to that required by a conventional mechanical keyboard. Furthermore, the solenoids for controlling the calculating machine are required to move only a small and lightweight indexing arm which permits the solenoids and the calculating machine to be operated in a relatively short time. Also the solenoids generate little heat when enregized due to the small amount of work performed by the solenoids which permits the solenoids to be continuously energized if desired.

What is claimed is:

1. In a data processing system the combination which comprises a calculating machine having means for entering and performing a selected operation on a decimal number during an operating cycle of the machine, the machine including a plurality of slidably disposed decade slide bars for controlling the individual digits of the number to be entered into the machine in accordance with the position of the individual decade slide bars, each of the decade slide bars having a plurality of spaced indexing tabs, means for moving the decade slide bars relative to the machine during an operating cycle, a character control solenoid module assembly including a first magnetic frame and nine spaced character control solenoids secured to the frame associated individually with each decade slide bar, each of the first frames being secured to the machine so that the solenoids of each module assembly are disposed above one of the decade slide bars, each of the character control solenoids including a magnetic core having one pole face disposed adjacent the bottom portion of the frame member and an armature rotatably mounted on the bottm portion of the frame member adjacent the pole face, each of the character control solenoids further including means for magnetically concentrating the path of the flux through said armature and away from the bottom portion of the frame, the armature having a magnetic plate extending from the axis of rotation of the armature under a portion of the frame adjacent the core of its solenoid, and an arm of nonmagnetic material extending downwardly and outwardly from the axis of rotation, spring means secured to each of the frames and coupled to each of the armatures of the character control solenoids for biasing the arms of the armatures in an upward direction, each of the arms being arranged to engage one of the indexing tabs of the respective decade slide bars to cause the slide bar to assume a selected position during an operating cycle of the machine when the respective solenoid is energized, the calculating machine further including a plurality of slidably disposed function control slide bars for controlling the operation of the machine during an operating cycle in accordance with the position of the function control slide bars, means for moving the function slide bars relative to the machine during an operating cycle, each of the function control slide bars including a plurality of spaced indentations, a function control solenoid module assembly including a second magnetic frame having a plurality of solenoids secured thereto, the second frame being secured to the machine so that solenoids thereof are disposed above the function control slide bar, each of the function control solenoids having a rotatably mounted armature including an arm extending outwardly and downwardly, a rotatably mounted stop member associated individually with each of the solenoids of the function control module assembly and arranged to engage one of the indentations in each of the function control slide bars when the respective solenoid is energized to stop the function control slide bars at selected positions indicative of a particular mode of operation for the machine during an operating cycle thereof, and means for selectively energizing the solenoids to enter a selected number into the machine and cause the machine to perform a selected operation.

2. The combination as defined in claim 1 wherein the last-named means includes a source of direct current energizing potential, a decade rotating switch having a movable contact and nine stationary contacts associated individually with each of the decade solenoid module assemblies, the stationary contacts of the decade rotating switches being connected to respective solenoids in the decade module assemblies, a function control rotating switch having a movable contact and a plurality of stationary contacts, the stationary contacts of the function control switch being connected to respective solenoids in the function control solenoid module assembly, means for rotating the decade and function control switches so that the movable contacts thereof engage selected stationary contacts thereof and means for selectively connecting the source of direct current energizing potential to the movable contacts of the decade and function control switches.

3. The combination as defined in claim 1 including a starting solenoid secured to the function control solenoid module assembly and means including the starting solenoid for initiating the operating cycle of the machine.

4. A solenoid module assembly for use with a data processing system of the class described including a magnetic frame, nine spaced solenoids secured to the frame, each of the solenoids including a magnetic core having one pole face disposed adjacent the bottom of the frame and an armature rotatably mounted on the frame adjacent the pole face, each of the character control solenoids further including means for magnetically concentrating the path of the flux through said armature and away from the bottom portion of the frame, the armature having a magnetic plate extending from the axis of rotation of the armature to a position under a portion of the frame and an arm of nonmagnetic material secured to the magnetic plate and extending generally downwardly and outwardly from the plate, the armature further including a pair of spring engaging members extending generally downwardly from the plate, and a helical spring secured at each end to the frame member and disposed over one of the spring engaging members of each of the armatures and under the other spring engaging member of each of the armatures to bias each of the magnetic plates of the armatures away from the frame, the arms of the armatures being arranged to move downwardly with respect to the frame when the solenoids are energized.

5. A calculating-printing machine adapted to be automatically operated through the replacement of the usual mechanical keyboard instrumentalities including the detent mechanisms utilized for manually operating the machine through the substitution of electrically actuated electromagnetic assemblies, said automatically operated machine including means for entering and performing a selected operation on a decimal number during an operating cycle of the machine, a plurality of slidably disposed decade slide bars for controlling the individual digits of the number to be entered into the machine in accordance with the position of the individual decade slide bars, each of the decade slide bars having a plurality of spaced indexing tabs, means for moving the decade slide bars relative to the machine during an operating cycle, a digit control solenoid module assembly including a plurality of digit control solenoids secured to the machine so that all the solenoids of each module assembly are disposed above one of the decade slide bars, each of the digit control solenoids including an armature defined with an indexing arm rotatably mounted to allow the indexing arm to be freely swung into the path of the slide bar to engage the indexing tab corresponding to the digit represented by the associated energized solenoid for causing the digit to be entered into the machine during an operating cycle thereof, means coupled to each of the armatures of the digit control solenoids for normally biasing the arms of the armatures out of the path of the associated slide bar, the calculating machine further including a plurality of slidably disposed control slide bars for controlling the calculating function of the machine during an operating cycle, means for moving the function slide bars relative to the machine during an operating cycle, each of the function control slide bars including a plurality of spaced indentations, a function control solenoid module assembly including a plurality of solenoids secured to the machine and disposed above the function control slide bar, and a rotatably mounted stop member individually associated with each of the solenoids of the function control module assembly and normally out of the path of said function slide bars and arranged to be rotated into engagement with one of the indentations in each of the function control slide bars when the respective solenoid is energized to index the function control slide bars at selected positions in accordance with a received signal indicative of a particular mode of operation for the machine, each of said function control solenoids including a rotatably mounted armature having an arm adapted to be freely swung into engagement wtih the associated stop member to rotate the stop member into engagement with the corresponding indentation of the function control slide bar.

6. In a data processing system the combination which comprises a calculating machine having means for entering and performing a selected operation on a decimal number during an operating cycle of the machine, the machine including a plurality of slidably disposed decade slide bars for controlling the individual digits of the number to be entered into the machine in accordance with the position of the individual decade slide bars, each of the decade slide bars having a plurality of spaced indexing tabs, means for moving the decade slide bars relative to the machine during an operating cycle, a character control solenoid module assembly including a first magnetic frame and a plurality of spaced character control solenoids secured to the frame and associated individually with each decade slide bar, each of the first frames being secured to the machine so that the solenoids of each module assembly are disposed above one of the decade slide bars, each of the character control solenoids including a magnetic core having one pole face disposed adjacent the bottom portion of the frame member and an armature defined with an indexing arm rotatably mounted on the bottom portion of the frame member adjacent the pole face to allow the indexing arm to be freely swung into the path of the slide bar to engage the indexing tab corresponding to the character represented by the associated energized solenoid for causing the character to be entered into the machine during an operating cycle thereof, means coupled to each of the armatures of the character control solenoids for normally biasing the arms of the armatures out of the path of the associated slide bar, the calculating machine further including a plurality of slidably disposed function control slide bars for controlling the calculating function of the machine during an operating cycle in accordance with the position of the function control slide bars, means for moving the function slide bars relative to the machine during an operating cycle, each of the function control slide bars including a plurality of spaced indentations, a function control solenoid module assembly including a second magnetic frame having a plurality of solenoids secured thereto, the second frame being secured to the machine so that solenoids thereof are disposed above the function control slide bar, a rotatably mounted stop member individually associated with each of the solenoids of the function control module assembly and arranged to be rotated into engagement with one of the indentations in each of the function control slide bars when the respective solenoid is energized to index the function control slide bars at selected positions in accordance with the data signal indicative of a particular mode of operation for the machine, each of said function control solenoids including a rotatably mounted armature having an arm adapted to be freely swung into engagement with the associated stop member to rotate the stop member into engagement with the corresponding identation of the function control slide bar, and a data source for selectively energizing the solenoids to enter a selected number into the machine and cause the machine to perform a selected calculating operation thereon.

7. A solenoid module assembly for use with an automatically operated calculating machine including a magnetic frame, a plurality of spaced solenoids secured to the frame, each of the solenoids including an armature rotatably mounted on the frame and means for magnetically concentrating the path of the flux through said armature and away from the adjacent portion of the frame, the armature having a magnetic plate extending from the axis of rotation of the armature to a position under a portion of the frame and an arm of nonmagnetic material secured to the magnetic plate, and a spring secured to the frame member and coupled to each of the armatures to bias each of the magnetic plates of the armatures away from the frame, the arms of the armatures being arranged to move downwardly with respect to the frame when the solenoids are energized.

8. In a solenoid module assembly for use with an automatically operated calculating machine including a magnetic frame, at least a single solenoid secured to the frame having an armature rotatably mounted on the frame and means for magnetically concentrating the path of the flux through said armature and away from the adjacent portion of the frame, the armature having a magnetic plate extending from the axis of rotation of the armature to a position under a portion of the frame and an arm of nonmagnetic material secured to the magnetic plate, and means secured to the frame and coupled to the armature for biasing the magnetic plate of the armature away from the frame, the arm of the armature being arranged to be freely swung outwardly from the frame upon energization of the solenoid.

References Cited in the file of this patent

UNITED STATES PATENTS

| | | |
|---|---|---|
| 2,293,127 | Fishack et al. | Aug. 18, 1942 |
| 2,724,550 | Drake et al. | Nov. 22, 1955 |
| 2,741,427 | Drake | Apr. 10, 1956 |
| 2,757,862 | Boyden et al. | Aug. 7, 1956 |
| 2,770,415 | Lindesmith | Nov. 13, 1956 |
| 2,812,902 | Runde et al. | Nov. 12, 1957 |
| 2,970,756 | Spesock et al. | Feb. 7, 1961 |